B. UPTON.
Upsetting Tires.

No. 32,390.

Patented May 21, 1861

Witnesses.

Inventor.
Benjamin Upton

UNITED STATES PATENT OFFICE.

BENJAMIN UPTON, OF ELYRIA, OHIO.

UPSETTING TIRES.

Specification of Letters Patent No. 32,390, dated May 21, 1861.

*To all whom it may concern:*

Be it known that I, BENJAMIN UPTON, of Elyria, in the county of Lorain and State of Ohio, have invented certain new and useful Improvements in Machines for Upsetting Wagon-Tires; and I do hereby declare that the following is a full, clear, and exact description thereof, reference being had to the accompanying drawings, they making a part of this specification, in which—

Figure 1:
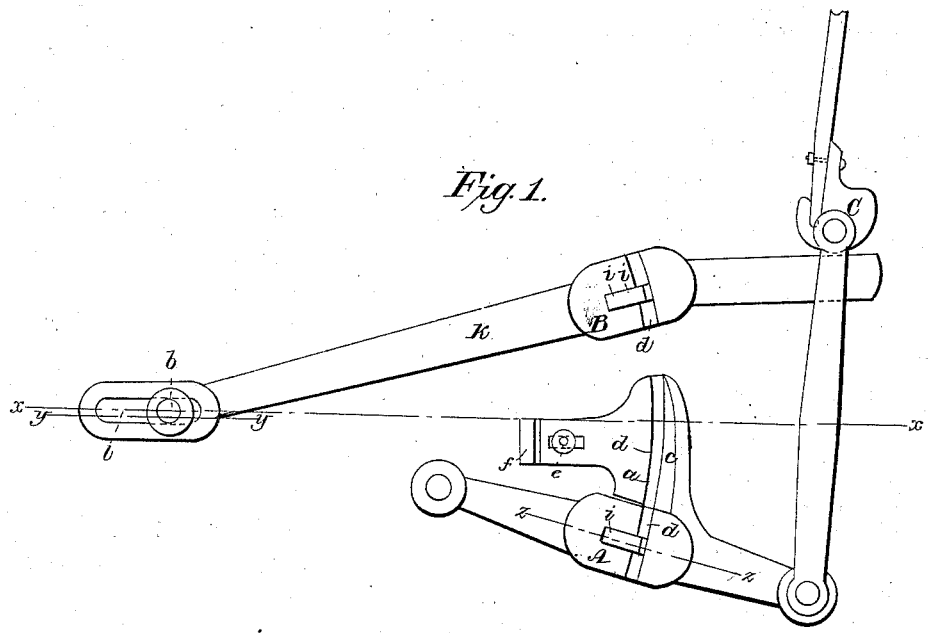
Figure 2:
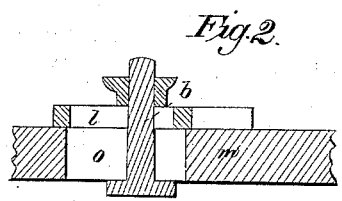
Figure 3:
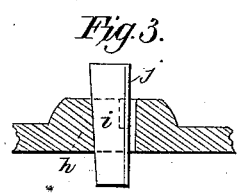

Figure 1 is a plan view. Fig. 2 is a sectional view in line "$y, y$" taken vertically. Fig. 3 is a sectional view in line "$z$—$z$" taken vertically.

Like letters refer to like parts in the different figures.

The nature of my invention consists in constructing a tire upsetting machine which has the facilities of being operated so as to render the direction of the pressure in a direct line with the periphery of the tire being operated upon, whether the tire be of a greater or less diameter, by which operation the operator is enabled to upset a tire without being subjected to the inconvenience of kinking or bending the same in short angles, which causes not only a great loss of time trouble &c. but does a positive injury to the metal in consequence of excessive heating, &c.

To enable others skilled in the art to make and use my invention I will now proceed to describe its construction and operation.

A, Fig. 1, represents a stationary clamping jaw or holder, which is provided with a circular groove "$a$." Said groove is described from the center pin "$b$," and is sufficient in width to admit any required thickness of tire. Said groove is continued on the same circular curve by means of a projection "$c$." See Fig. 1. The outer wall of said continuation of the groove is fixed stationary, but the inner wall "$d$" is movable so as to be adjustable to the thickness of the tire in that portion which is heated, and is to be acted upon or "upset." The adjustment is simply by means of a set screw "$e$" inserted in a suitable groove and secured to the bedplate, together with a wedge which may be inserted in a recess "$f$" in its rear or in any other convenient manner. B, is another clamping jaw which is constructed in the same manner as the one described as A, and having a circular groove "$a'$" described with the same radius, and from the same center "$b$," and vibrating in a segmental line therewith. Each of said clamping jaws are provided with radial keyseats passing vertically through the bedplates see Figs. 1 and 3. The inner wall "$h$" of said key seats are not perpendicular, but somewhat inclined, so that the wedges "$i\ i$" when inserted form a vertical fan "$j$" to the tire and thus clamp it firmly, having a bearing on its entire width.

The clamping jaw B is connected to an adjustable center pin "$b$" by means of an arm "$k$" from which it radiates, that center being the same from which the segmental groove "$a$" is described. This center is made adjustable in a line running from thence and passing equidistant between the clamping wedges before described. Said line is marked in red, Fig. 1, $x, x$.

"$l$" is a slot (see Fig. 2,) which is formed in the end of arm "$k$" which is enlarged for that purpose, and also through a parallel slot "$o$" formed in bed piece "$m$" upon which the apparatus is secured and operated; center pin "$b$" passes vertically through this slot, and may be tightened by means of a set screw or otherwise.

The object of this device is clearly to change the length of the radial arm, so as to make it equal to the length of the radius of the great variety of sizes of tire, there being seldom two of the same diameter, even on the same wagon. For this reason when a tire to be operated upon of a diameter having a greater or less radius than the length of the said radial arm, it is plain that the pressure used in upsetting the tire would not be on the same curve or circle as that of the tire, but would distort the curve in one direction or the other according as the pin "$b$" was out of center. It is therefore plain that in order to compress or "upset" the iron without kinking or distorting it, it must be forced in its natural direction, and in order to do that, we must adjust the center of motion to the center of the tire, which by this means is readily done. It is also clear that to adjust the center pin "$b$" in any other direction than that passing through the center of that part of the iron being compressed as indicated in the drawing in red, that it would throw the whole apparatus out of center, and thus be in a worse condition than it would have been before adjusting, from the fact that clamping jaw B, would describe the arc of a circle from another center entirely, and thus act in the same manner as all other machines do now, in use, that is giving the tire a curve somewhat in the form of a curve called the cyma keeta, which is very troublesome to bring back to its original curvilinear form, thus the advantages derived are of no ordinary character, inasmuch as that the whole tire after being upset still retains its original circular form, and may be set without further trouble.

C represents an eccentric lever which acts upon and facilitates the vibrations of the clamping jaws.

What I claim as new and desire to secure by Letters Patent is—

The adjustable center pin "$b$," passing through slots "$l$" and "$o$" said slots running in the exact specified direction in combination with radial keys or wedges "$i$" and "$i'$," constructed as described, for the purpose of centering the tire to be operated upon and thereby prevent its being distorted or kinked the whole being constructed in the manner and for the purpose substantially as specified.

BENJAMIN UPTON.

Attest:
H. F. WILLSON.
CHAS. A. WRIGHT.